United States Patent
Borgione

(10) Patent No.: US 7,586,895 B2
(45) Date of Patent: Sep. 8, 2009

(54) PERFORMING EXTENDED LOOKUPS ON MAC-BASED TABLES INCLUDING LEVEL 3 MULTICAST GROUP DESTINATION ADDRESSES

(75) Inventor: Gaetano Borgione, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 562 days.

(21) Appl. No.: 11/096,738

(22) Filed: Apr. 1, 2005

(65) Prior Publication Data

US 2006/0221960 A1 Oct. 5, 2006

(51) Int. Cl.
- H04L 12/56 (2006.01)
- H04L 12/28 (2006.01)
- H04J 3/16 (2006.01)
- H04J 3/24 (2006.01)

(52) U.S. Cl. .................. 370/349; 370/389; 370/392; 370/471; 370/474

(58) Field of Classification Search ............. 370/349, 370/389, 471, 474
See application file for complete search history.

(56) References Cited

U.S. PATENT DOCUMENTS

| | | | | |
|---|---|---|---|---|
| 6,011,795 | A * | 1/2000 | Varghese et al. | 370/392 |
| 6,018,524 | A * | 1/2000 | Turner et al. | 370/392 |
| 6,526,055 | B1 * | 2/2003 | Perlman et al. | 370/392 |
| 6,563,823 | B1 * | 5/2003 | Przygienda et al. | 370/392 |
| 6,697,363 | B1 * | 2/2004 | Carr | 370/389 |
| 6,697,380 | B1 * | 2/2004 | Egbert et al. | 370/469 |
| 6,876,655 | B1 * | 4/2005 | Afek et al. | 370/392 |
| 7,039,018 | B2 * | 5/2006 | Singh et al. | 370/255 |
| 7,054,993 | B1 * | 5/2006 | Srinivasan et al. | 711/108 |
| 7,089,240 | B2 * | 8/2006 | Basso et al. | 707/6 |
| 7,116,663 | B2 * | 10/2006 | Liao | 370/392 |
| 7,260,096 | B2 * | 8/2007 | Basso et al. | 370/392 |
| 2003/0235191 | A1 * | 12/2003 | Heggarty et al. | 370/389 |
| 2004/0013113 | A1 | 1/2004 | Singh et al. | 370/389 |

OTHER PUBLICATIONS

S. Deering et al., "Host Extensions for IP Multicasting", Aug. 1989, IETF Standard (RFC 1112), Internet Engineering Task Force.*
S. Bhattacharyya et al., "An Overview of Source-Specific Multicast (SSM)", Jul. 2003, IETF Standard (RFC 3569), Internet Engineering Task Force.*

(Continued)

Primary Examiner—Kwang B Yao
Assistant Examiner—Adam Duda
(74) Attorney, Agent, or Firm—Campbell Stephenson LLP

(57) ABSTRACT

A method, system, and computer program product are presented to optimize OSI Level 2 switch forwarding of frames comprising IP addresses, 802.1 QinQ VLAN identifiers, multi-protocol label switching labels, and any other usable information meaningful to derive an L2 forwarding result on frames. In one embodiment, a 16-bit key is included as a prefix to a 48-bit OSI Level 2 address entry, thereby allowing the inclusion of a 32-bit OSI Level 3 address in the lookup table (e.g., a complete IP version 4 address). Implementations of such a solution are presented to resolve address aliasing issues experienced with multicast group destination addresses, including single source multicast. Solutions to optimizing forwarding of frames in an IEEE 802.1 QinQ environment are also presented. A result of these implementations can be reduction of the amount of unnecessary network traffic generated by a network switch incorporating such an OSI Level 2 address lookup table.

16 Claims, 12 Drawing Sheets

OTHER PUBLICATIONS

The Cable Guy, "Overview of IP Multicast", Feb. 2002, Microsoft TechNET, pp. 1-5.*

Firewall.cx et al., "Introduction to Multicast", Apr. 21, 2003, Firewall.cx, all pages.*

International Search Report as mailed from the PCT on Dec. 7, 2006, for counterpart WO Application (PCT/US06/011607; Filed Mar. 29, 2006), 5 pages.

S. Deering, Network Working Group, RFC 1112, "Host Extensions for IP Multicasting," IETF Standard, Internet Engineering Task Force, Aug. 1989, pp. 1-17.

S, Bhattacharyya, Network Working Group, RFC 3569, "An Overview of Source-Specific Multicast (SSM)," IETF Standard, Internet Engineering Task Force, Jul. 2003, pp. 1-14.

* cited by examiner

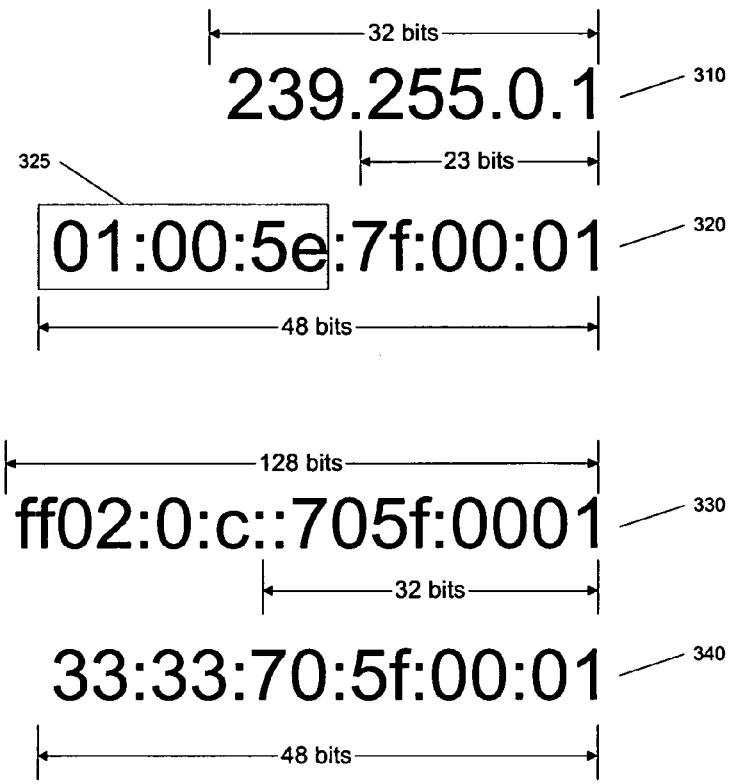
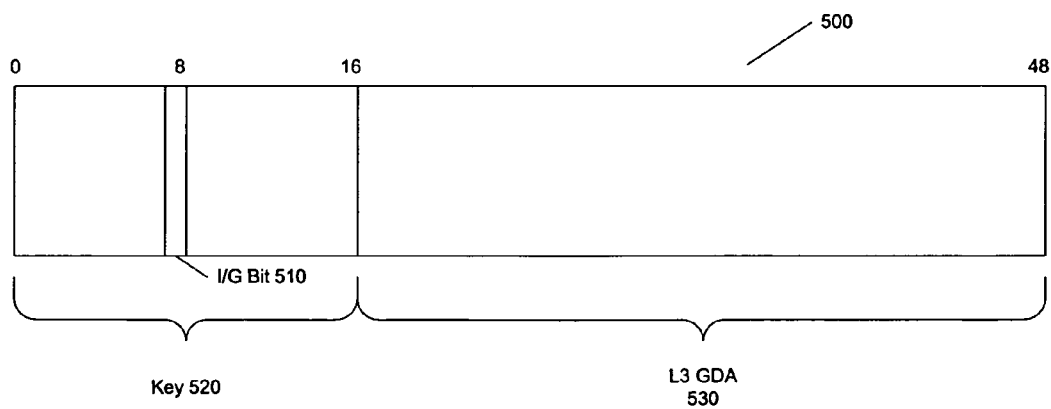
Figure 3
Figure 5

PERFORMING EXTENDED LOOKUPS ON MAC-BASED TABLES INCLUDING LEVEL 3 MULTICAST GROUP DESTINATION ADDRESSES

FIELD OF THE INVENTION

The field of this invention relates to information networks. Specifically, a method, system, and apparatus are presented to provide a representation of a 32-bit address in an OSI Level 2 switch address table; thus, allowing for the inclusion of a full IPv4 Multicast Address in the OSI Level 2 switch address table, thereby eliminating address aliasing.

BACKGROUND OF THE INVENTION

Today's network links carry vast amounts of information. High bandwidth applications supported by these network links include, for example, streaming video, streaming audio, and large aggregations of voice traffic. In the future, network bandwidth demands will increase. Certain applications, such as streaming audio and streaming video, can generate a large amount of network traffic due to sending such a transmission to multiple subscribers. In order to help decrease network traffic load due to such applications, multicast extensions to network protocols have been developed.

Multicast protocols enable multicast transmission (i.e., one-to-many connections) by replicating a multicast network frame close to the destination of that frame, obviating the need for multiple unicast connections for the same purpose, saving network bandwidth and improving throughput. Upon receiving a multicast frame, a network node can examine a multicast group destination address (GDA) of the frame and determine whether subscribers to the multicast frame are connected to the network node. The network node can then duplicate the multicast frame as needed and transmit the multicast frame to any connected subscribing nodes.

FIG. 1 is a simplified block diagram of a network switch 100. The switch provides ports 110(1)-(N), wherein a network frame arriving at any port can be directed to any other port connected to the switch as determined by an examination of the frame's destination address. Connected to each port are network nodes 120(1,1)-(N,M). In a typical network environment, each node 120(1,1)-(N,M) has a unique media access control (MAC) address. Switch 100 can learn the MAC addresses of network nodes 120(1,1)-(N,M) as those nodes transmit frames to each other via the switch. Each frame transmitted by a network node contains a source MAC address that switch 100 can read and associate with a port 110(1)-(N). Such node-port information is stored in an address table. Such a table has been called an L2 Address table (referring to Level 2 of the Open System Interconnection networking framework for implementing protocols, which is also called the data link layer) or a MAC Address table.

Within the OSI network model a network node, or utilities on a network node, can have a different representation of its network address at each level of the model. Switch 100 can operate at Level 2 (L2) (i.e., the data link layer of the OSI model). These L2, or MAC addresses, of a network node are unique to each network interface on a network and are typically hardware encoded in the network interface. MAC addresses are 48 bits in lengths, containing a 24 bit vendor code followed by a 24 bit hardware address. A network node can also have an OSI Level 3 address, which can include addresses such as internet protocol (IP) addresses. IP addresses are software encoded and can be supplied by an administrator or can be dynamically determined within the environment that the network node resides. In version four of the internet protocol (IPv4), L3 addresses are 32 bits in length, while in internet protocol version 6 (IPv6), L3 addresses are 128 bits in length. When transmitted over a network, an OSI Level 3 packet will be encapsulated within an OSI Level 2 frame, therefore such frames can contain both L2 and L3 source and destination addresses.

FIG. 2 illustrates a L2 address table showing the node-port associations of switch 100. Each entry in the table has an associated index 210. The number of entries in the table can be equal to the number of nodes connected to switch 100 (e.g., P). Each entry in the table contains a MAC address 220 that corresponds to a source MAC address found in frames transmitted by each node (e.g., SMAC (120(1,1)) is the source MAC address for node 120(1,1)). Each L2 address table entry also includes a port 230 corresponding to the node, wherein the association is made by switch 100 when it receives a frame from the network node. Information linking a node address with a particular port is related to the hardware of the node (e.g., a network interface) and is typically static in a L2 address table, unless a node is physically moved from one port to another port on the switch.

An L2 address table cannot automatically be populated with multicast destinations as done with node-port designations. This is because a multicast GDA cannot be a source MAC address. Portions of L3 multicast GDAs are included in an L2 address table through the use of software protocols such as the internet group management protocol (IGMP). When a network node wishes to subscribe to a multicast transmission, a special IGMP protocol frame is transmitted as a multicast "join" request. An IGMP-enabled switch will have a "snooping" software running on the switch to read such a frame and build a corresponding entry for the L2 address table. Such an entry can relate a form of the multicast GDA (an L3 address) with ports that are connected to subscribing nodes.

An IGMP frame contains an L3 GDA along with other information pertinent to the operation requested in the IGMP frame. Such an L3 address requires manipulation to be included in an L2 address table.

FIG. 3 illustrates a manipulation of IPv4 and IPv6 multicast group destination addresses into a form acceptable for inclusion into entries of an L2 address table. An IPv4 GDA is 32 bits in length and falls in the range of addresses 224.0.0.0-239.255.255.255. Such an IP address is illustrated at 310 in FIG. 3. As stated above, an L2 address is limited to 48 bits, which is split into two 24 bit segments. The first three octets (the first 24 bits) of an L2 MAC multicast address are set to 01:00:5E (325). To create an L2 MAC multicast address for the L2 address table corresponding to an L3 GDA, the last 23 bits of the L3 GDA are inserted into the last 23 bits of the MAC address 320. Since a portion of the 32 bit IPv4 address is being inserted into the 23 bit area of the MAC address, nine bits of information are lost from the IPv4 address. Five of the nine bits are significant, since the first four bits of any IPv4 multicast address are always 1110. Such loss of information is referred to as address aliasing, since more than one L3 GDA can be represented by a single L2 MAC multicast address. (For example, an IPv4 GDA 239.255.0.1 will share an L2 MAC multicast address with other IPv4 GDAs such as 238.255.0.1 and 239.127.0.1.) The address aliasing problem is magnified with IPv6 GDAs as illustrated in 330 and 340. An IPv6 address 330 is 128 bits in length, and therefore 80 significant bits are lost in the transition from an L3 IPv6 GDA to a L2 MAC address.

Address aliasing of multicast addresses can result in an increase in network traffic due to frames being sent to a first IP multicast group also being sent to other IP multicast groups that share the same low order 23 bits in the L3 multicast addresses. Further, overhead at receiving nodes can be increased due to unsubscribing nodes having to drop frames. Both the increase in traffic and the dropping of frames results in a waste of network bandwidth resources. It is therefore desirable to construct multicast entries in an L2 address table in such a way that the loss of L3 GDA information is eliminated or reduced, thereby allowing more extensive lookups for multicast frames.

BRIEF DESCRIPTION OF THE DRAWINGS

The present invention may be better understood, and its numerous objects, features and advantages made apparent to those skilled in the art by referencing the accompanying drawings.

FIG. 3 illustrates a manipulation of IPv4 and IPv6 addresses into a form acceptable for inclusion into entries of an L2 address table.

FIG. 5 illustrates a format of a modified L2 address table entry for a multicast group address in accord with one embodiment of the present invention.

DETAILED DESCRIPTION

The present invention provides for the availability of at least 32 bits of addressing information in multicast entries of an L2 address table. This will permit the inclusion of a full IPv4 multicast GDA in the entries of the L2 address table, thereby eliminating address aliasing of IPv4 multicast GDAs. Using such an L2 address table will also optimize forwarding issues that arise in source specific multicast (SSM) and 802.1Q-in-Q (QinQ) scenarios, through the use of chained address lookups. Such an increased address space in a L2 address table can also serve to reduce address aliasing that occurs with IPv6 L3 multicast GDAs.

Address aliasing and an increase in transmission of multicast frames due to address aliasing is caused by the necessity of truncating a 32 bit IPv4 multicast GDA into a 23 bit space in an L2 address table entry. If a full 32 bit IPv4 multicast GDA (IPv4 GDA) can be included in that L2 address table entry, then no address aliasing will occur, nor will there be an increase in network multicast traffic due to such network aliasing.

The least significant bit of the first octet of a multicast MAC address is the so-called I/G bit (individual/group bit). An I/G bit set to a 1 indicates that the address is a multicast or broadcast address. An I/G bit set to a 0 indicates that the address is a unicast address. A broadcast destination address is distinguished from a multicast destination address if all destination MAC address bits are set to 1 (e.g., the destination MAC address is ff:ff:ff:ff:ff:ff). Thus, the only part of a MAC address that is needed in order to identify it as a multicast address is an I/G bit being set to a one. As stated above, when a multicast address is included in a L2 address table entry, the first 24 bits contain octets 01:00:5e. Since this is a fixed pattern, it can be compressed using some sort of key that retains the I/G bit set to 1; thereby avoiding any interference with L2 unicast addresses stored in the L2 address table.

Figure 1:
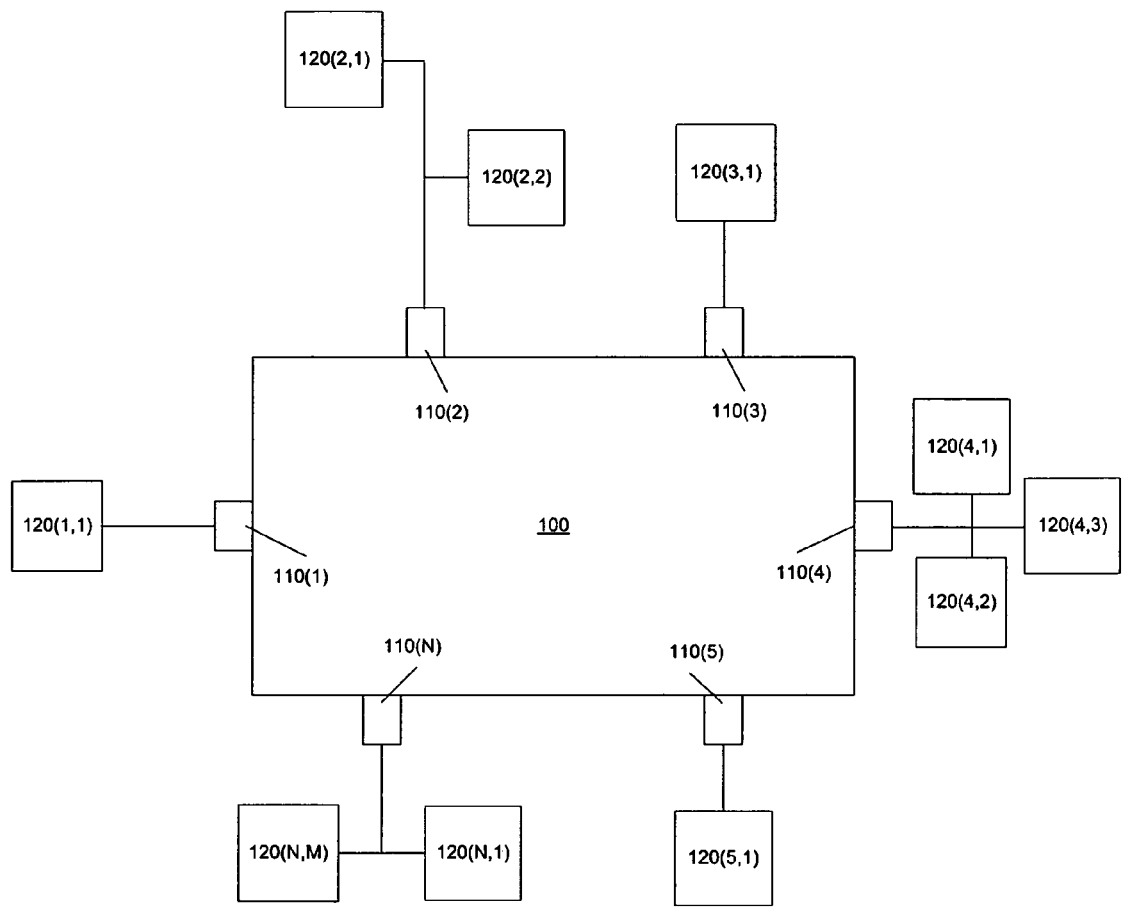
FIG. 1 illustrates a simplified block diagram of a network switch.
Figure 2:
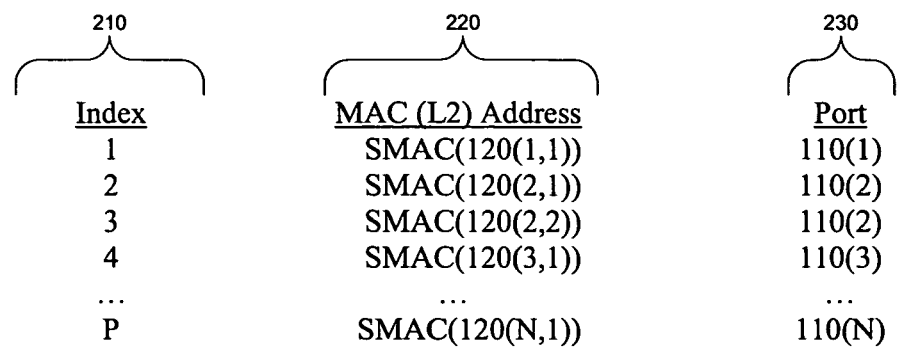
FIG. 2 illustrates a L2 address table showing the node-port associations of a switch such as that illustrated in FIG. 1.
Figure 4:
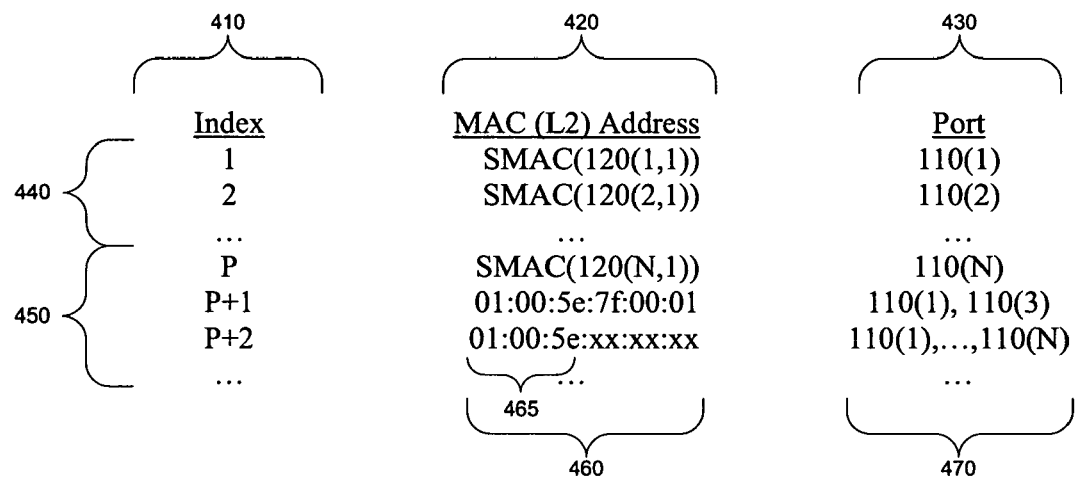
FIG. 4 illustrates an L2 address table including traditional MAC multicast destination addresses.

FIG. 4 illustrates an L2 address table including traditional MAC multicast destination addresses. As with FIG. 2 the table contains an initial set of P entries, each containing index 410, address 420 and port 430. The first set of unicast addresses 440 is received into the table as discussed above. A set of multicast destination addresses 450 is illustrated as additional entries (P+1) and (P+2). As illustrated, a generic MAC multicast destination address 460 includes: the initial octets 01:00:5e, followed by a subsequent set of three octets into which bits from the IPv4 GDA are inserted. Each multicast entry is associated with a group of one or more ports linked to subscribing network nodes 470.

FIG. 5 illustrates a format of a modified L2 address table entry for a multicast group address (L2 GRP) in accord with one embodiment of the present invention. As stated above, the L2 GRP table entry must include an I/G bit equal to one, where the I/G bit is the least significant bit of the first octet of the address entry. Entry 500 includes such an I/G bit 510, but incorporates it within a 16 bit key 520, rather than in 32 bits containing octets 01:00:5e. By limiting the key to a total of 16 bits, 32 bits are made available for the inclusion of an L3 GDA 530.

Use of a 16 bit key 520 rather than octets 01:00:5e is not disruptive to the utilization of an L2 address table. The multicast L2 GRP entries of the L2 address table will not be referenced unless looking up an IPv4 multicast address. Further, since L2 GRP addresses are dynamic and entered by software, changes to the hardware need not be made to accommodate the L2 GRP entries in an L2 address table.

In the event that a multicast frame (I/G bit=1) containing a destination MAC address that includes a match to key 520 arrives at a network device utilizing the above L2 address table, incorrect forwarding to multicast subscriber ports can result. A solution can be either to broadcast the incoming frame to all nodes on the corresponding broadcast domain (e.g., a VLAN) or to drop the frame, depending upon the specific implementation. Such a decision can be made prior to any L2 address table lookup. For example, a chosen key can have a hex value of 0x0101. If a non-IP multicast frame arrives with a destination MAC address of 0101.e022.2222, such a MAC address can collide with an L2 GRP corresponding to IPv4 GDA 224.34.34.34 and would be wrongly forwarded to ports subscribing to that L2 GRP if an L2 address table lookup was performed.

Applications for the above-described modified L2 address table entries go beyond solving the address aliasing problem present with IPv4 GDAs. Chaining of such 32 bit address table lookups can be performed to address issues presented by SSM and QinQ applications. Further, the additional address space in the L2 address table reduces address aliasing issues presented by the longer addresses found in IPv6 multicast lookups and also allows the usage of different types of lookups (e.g., multi-protocol label switching (MPLS)).

Source Specific Multicast

Figure 6:
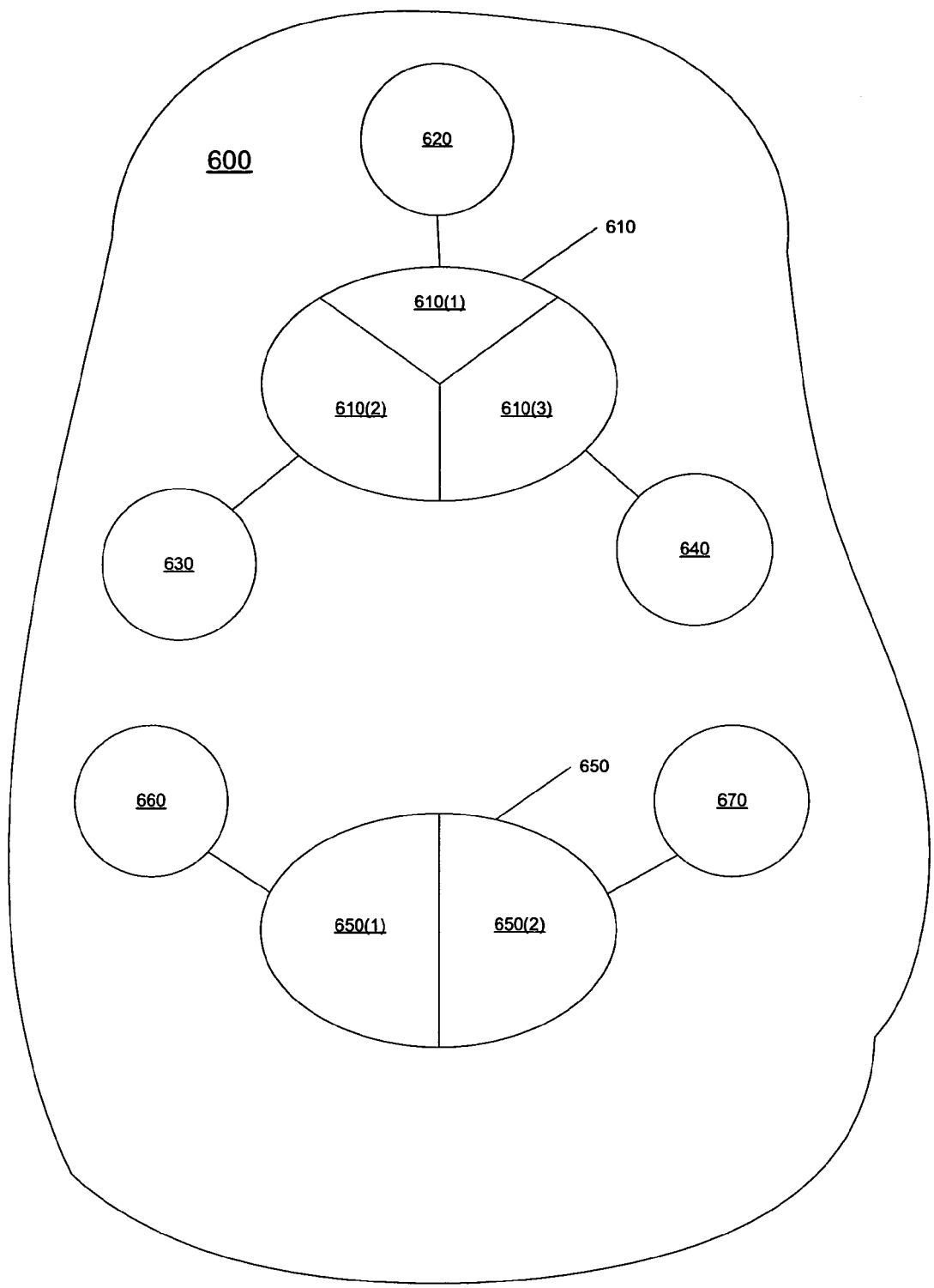
FIG. 6 is a simplified block diagram illustrating the concept of source specific multicasting (SSM) as addressed by one embodiment of the present invention.

FIG. 6 is a simplified block diagram illustrating the concept of source specific multicasting (SSM) as addressed by one embodiment of the present invention. Network 600 contains two multicast groups 610 and 650. Due to reasons such as geography or a desire to distribute server/network load over network 600 there are multiple multicast transmission sources for each group 610 and 650. A multicast subscriber node can specify not only a desire to join a particular group but also can subscribe to the source of the transmission. As an example, group 610 is divided into three subgroups 610(1), 610(2), and 610(3). Each subgroup is served by a source 620, 630, and 640, respectively. Similarly, a second group of multicast subscribers (e.g., subscribers to a different multicast transmission) is divided into two subgroups 650(1) and 650(2), which have as their sources 660 and 670, respectively.

IGMPv3 provides the ability for a subscriber node to specify not only the multicast group the node wishes to join but also the source of the multicast. It can be seen, however, that if an L2 address table lookup was limited to only the group (as described above) then the source distinction would be lost. Further, if a group or source address was limited to only 23 bits, then there is a multiple address aliasing problem. Merely modifying L2 address table entries to include 32 bit address fields doesn't solve this issue either since both group and source addresses are 32 bit IPv4 fields. A 64 bit set of addresses is too big for even the modified L2 address described above to contain in a single entry. Chaining lookups in a modified L2 address table can resolve this problem.

Figure 7:
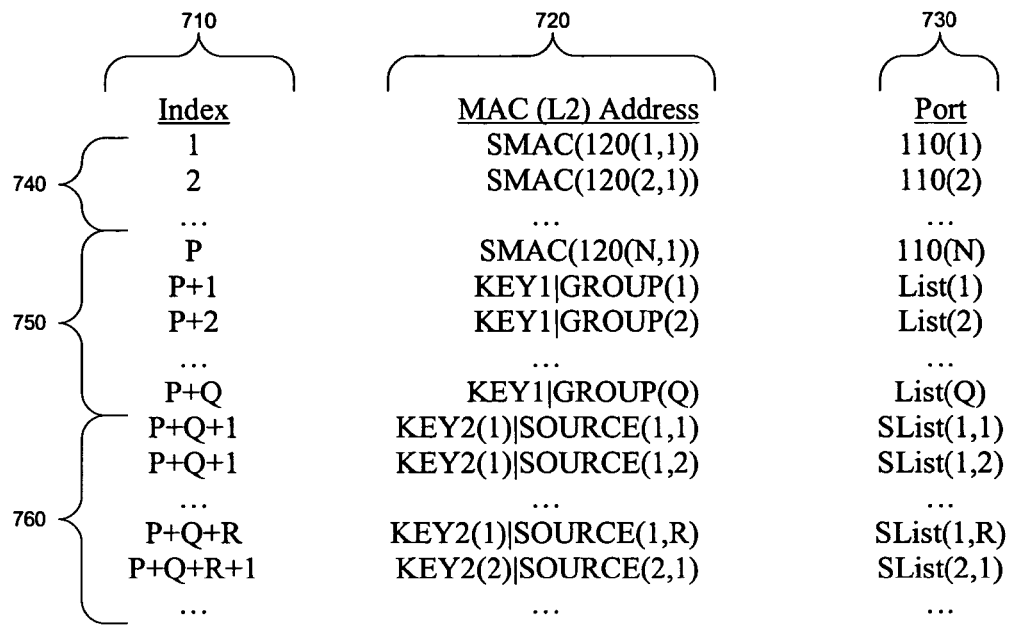
FIG. 7 illustrates an example of an L2 address table incorporating entries modified in accord with one embodiment of the present invention for use in resolving source specific multicast.

FIG. 7 illustrates an example of an L2 address table incorporating entries modified in accord with one embodiment of the present invention for use in resolving source specific multicast. As with FIGS. 2 and 4, the illustrated table includes entries including an address 720 and a set of designated ports corresponding to that address 730. Each table entry has an associated index 710. The set of entries 740 correspond to the unicast destination addresses 1 to P, as described in FIG. 2. The set of entries 750 beginning at index (P+1) and continuing to index (P+Q) contain L2 GRP addresses with a first key (KEY1) and a 32 bit GDA (GROUP(1)-GROUP(Q)). L2 GRP can be of a format as illustrated in FIG. 5. Entries 750 can also include a listing of each port corresponding to nodes that subscribe to L2 GRP (List(1)-List(Q)). As discussed above, KEY1 is a 16 bit field including an I/G bit equal to one.

FIG. 7 includes another set of entries 760 that allow for specification of multicast source. For these entries a 32 bit source address (SOURCE (1,1)-SOURCE (Q,R)) is associated with a second key (KEY2), together called L2 SRC. KEY2 corresponds to the index (e.g., index 710 of FIG. 7) of the group entry with which the source is associated. For example, referring to FIG. 6, a lookup of group 610 can result in a determination of a first index related to group 610's entry. One can then use that first index as a key that is associated with a 32 bit address of one of source 620, 630, or 640, which is used in a lookup of an entry 760 to determine a list of subscriber destination ports (e.g., SList(1)). In this manner, group destination address ports and source destination ports can be presented and resolved in an L2 address table.

For reasons similar to those presented in the previous section, this modification of an L2 address table to allow for chained lookups to resolve SSM destination ports will not interfere with traditional L2 address table lookups. Entries corresponding to multicast sources will not be reached in a lookup without an appropriate key, and such a key will not be had unless acquired through the initial group destination address lookup. Further, since a multicast frame contains both the L3 GDA as well as designation of L3 source address, no new information need be provided by the multicast frame.

QinQ

QinQ network protocols enable service providers to use a single virtual LAN (VLAN) to securely transport most or all of a single customer's VLANs across the service provider's metropolitan area network (MAN) or wide-area network (WAN) backbone. The software that permits this adds an extra IEEE 802.1Q tag to customers' traffic in a switch at the edge of the service provider's network. This tag assigns a unique customer VLAN ID number (PE_VLAN) to each customer to keep each customer's traffic segregated and private in the provider's network. All of a customer's VLANs (CE_VLAN) are combined at the edge switch for transport into the provider network. This allows for routing customer VLANs (or bridge domains) across a provider VLAN.

Figure 8:
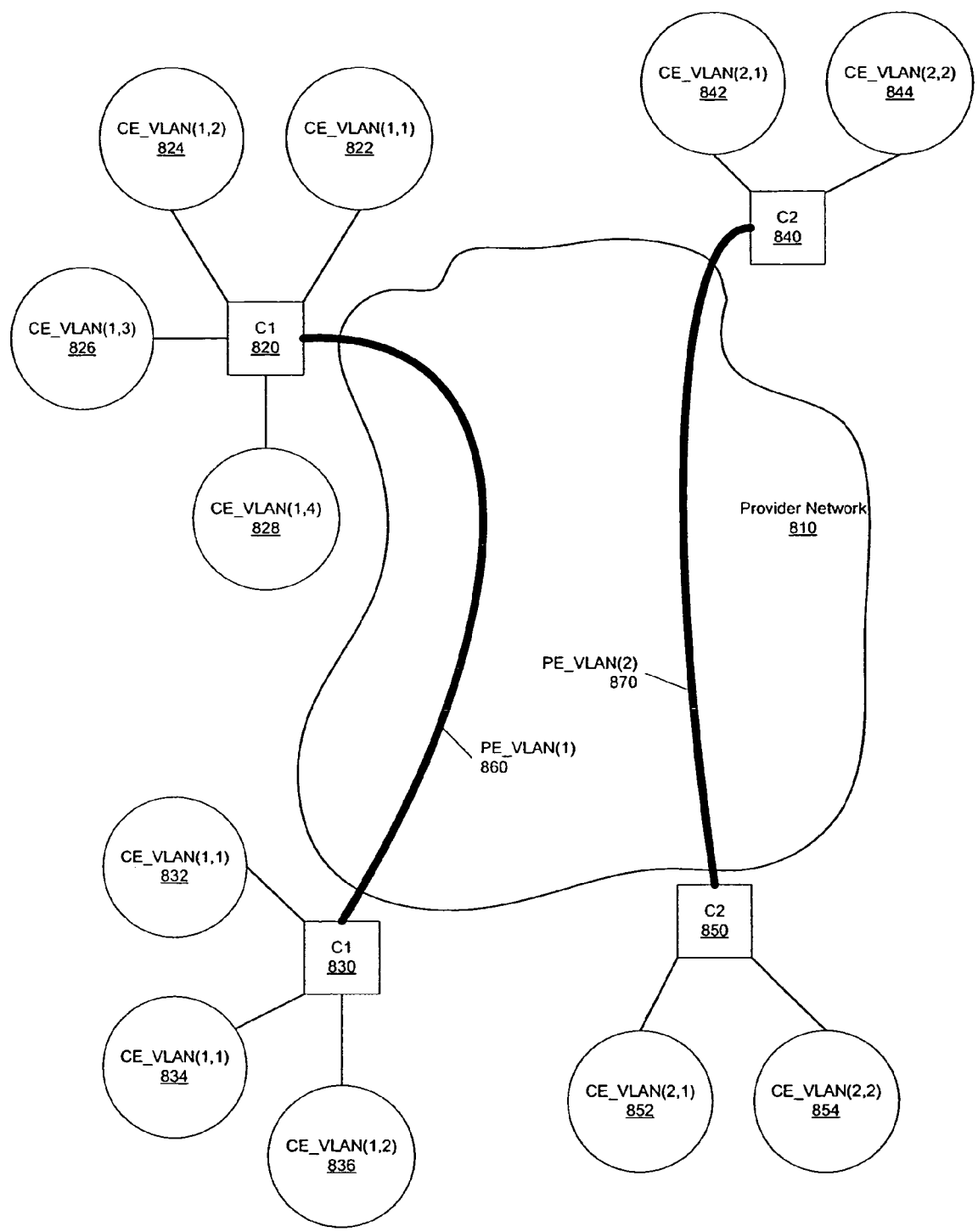
FIG. 8 is a simplified block diagram illustrating the use of provider VLANs to transport customer VLANs.

FIG. 8 is a simplified block diagram illustrating the use of provider VLANs to transport customer VLANs. Provider network 810 (a MAN or a WAN) provides network transport for two customers C1 and C2. Customer C1 transmits traffic between two sites on network 810, site 820 and site 830. Likewise, customer C2 transmits traffic between sites 840 and 850. Local area networks for customers C1 and C2 are divided into local VLANs as a mechanism for localizing network traffic. At site 820, customer C1 supports CE_VLAN (1,1) (822,826) and CE_VLAN(1,2) (824,828). Customer C1 supports at site 830: CE_VLAN(1,1) (832,834) and CE_VLAN(1,2) (836). Customer C2 supports CE_VLAN(2,1) (842) and CE_VLAN(2,2) (844) at site 840 and CE_VLAN (2,1) (852) and CE_VLAN(2,2) (854) at site 850. Through the use of QinQ encoding, VLAN traffic at site 820, for example, can be transported across PE_VLAN 860 to site 830 and C2's traffic can be similarly transmitted across PE_VLAN 870.

A problem with the QinQ method arises with both unicast and multicast addressing. The introduction of a PE_VLAN identifier on the provider network will impede regular usage of initial CE_VLAN information to optimize forwarding of L2 traffic among different remote sites for a specific customer. Regular switches are not capable of inspecting and using both PE_VLAN and CE_VLAN information to derive forwarding actions on customer frames.

Figure 9:
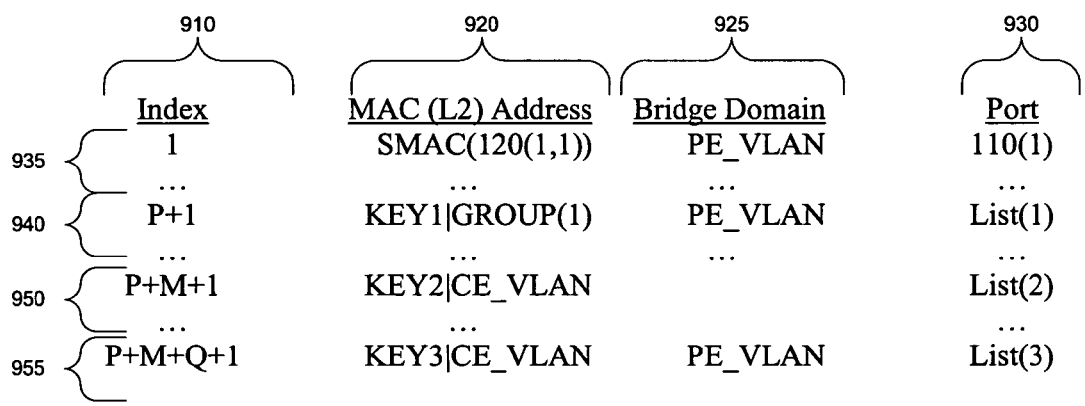
FIG. 9 illustrates an L2 address table incorporating elements to allow QinQ address resolution in accord with one embodiment of the present invention.

FIG. 9 illustrates an L2 address table incorporating elements to allow QinQ address resolution in accord with one embodiment of the present invention. FIG. 9 illustrates an L2 address table of a format similar to that shown in FIG. 7. The L2 address table contains a MAC address (920) that can be a source MAC address for network nodes connected to ports for unicast address resolution, and, for multicast, L2 GRP entries with a 16 bit key and a 32 bit L3 GDA. The L2 address table further includes a listing of subscriber ports (930). Each entry 935 (unicast) and 940 (multicast) includes an additional field related to a bridge domain, which is the PE_VLAN (925). A PE_VLAN and a CE_VLAN designation can be between 12 to 14 bits in length.

For multicast, a table lookup to resolve QinQ addresses is similar to that used in FIG. 7 for SSM protocol addresses. A KEY1 is added to the L3 GDA and a PE_VLAN designation also pulled or derived from the multicast frame. A search is conducted on the L2 address table to find matches to both L2 GRP (KEY1|L3 GDA) and PE_VLAN in order to determine an entry index. The index becomes a second key that is coupled to a CE_VLAN designation from the multicast frame and a second table lookup is performed. The result of the second table lookup is a determination of the switch ports connected to network nodes that are subscribers to the multicast frame.

For unicast frames, the table lookup to resolve QinQ addresses is similar to that for multicast addresses. The destination MAC address along with the PE_VLAN designation is pulled or derived from a unicast frame. A search is conducted on the L2 address table to find matches for both the destination MAC address in table section 920 and the PE_VLAN address in table section 925. If there is a match, then the frame is broadcast to the port indicated in table section 930. If there is no match, then a CE_VLAN designation is pulled from the frame, and a search is conducted on the L2 address table to find matches to both a QinQ_Flood (KEY3|CE_VLAN) and the PE_VLAN designation in table sections 920 and 925 respectively. KEY3 can be a chosen key. The result of this table lookup will provide either a set of ports corresponding to the CE_VLAN on which to transmit the frame (e.g., 955), or if there is no match, then a determination can be made as to whether to drop the frame or broadcast the frame on the PE_VLAN.

As discussed in the SSM scenario, addresses linked with KEY2 cannot interfere with normal operation of the L2 destination table. Such addresses would not even be examined unless KEY2 was provided, which can only be derived from the initial lookup of L2 GRP and PE_VLAN.

Figure 10:
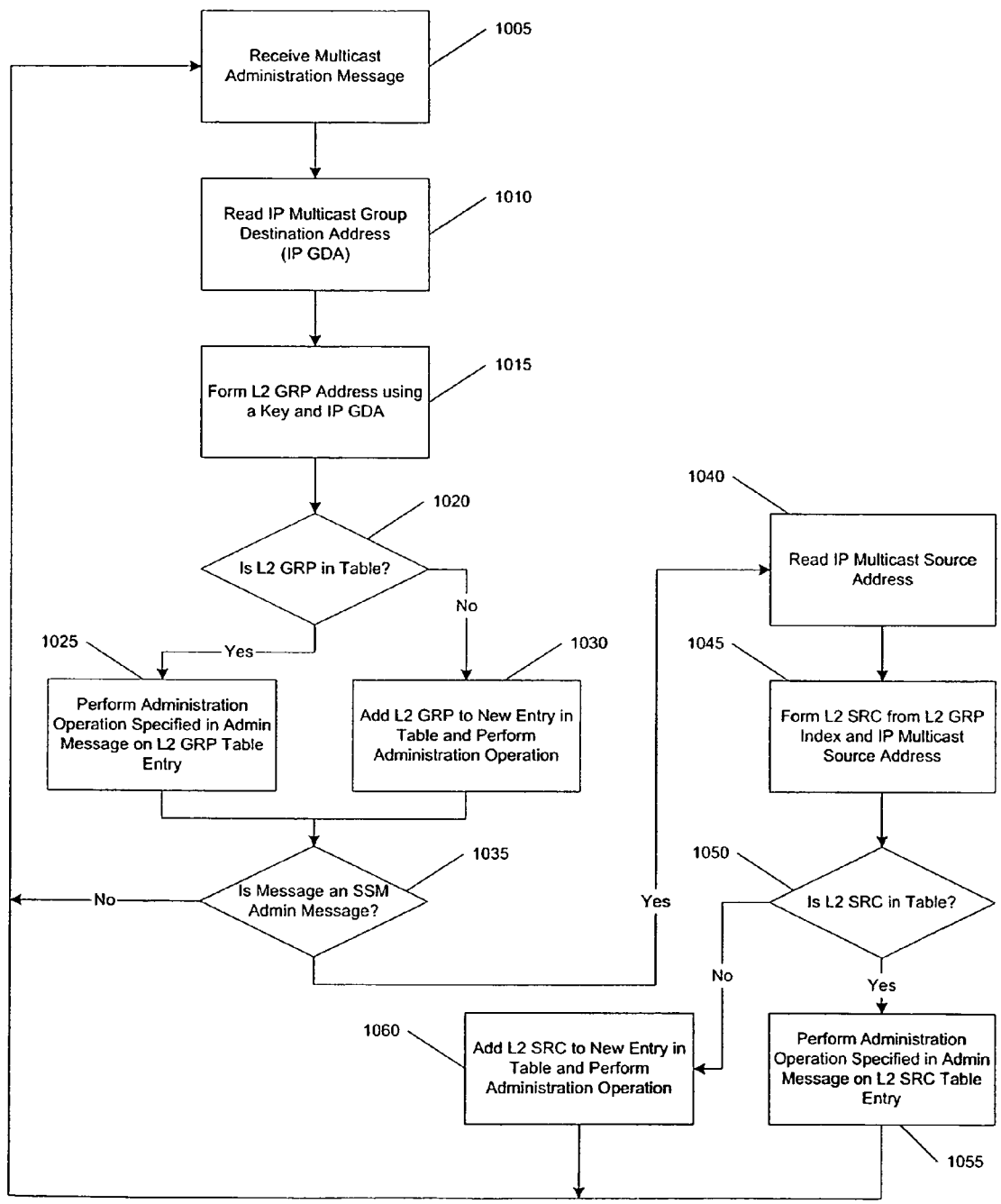
FIG. 10 is a simplified flow diagram illustrating steps that can be taken to populate an L2 address table with 32-bit L3 GDA fields in accord with one embodiment of the present invention.

FIG. 10 is a simplified flow diagram illustrating steps that can be taken to populate an L2 address table with entries having 32-bit L3 GDA fields in accord with one embodiment of the present invention. A multicast administration message, such as an IGMPv3 message to join, is received by a node incorporating an L2 address table such as a network switch (1005). An IP multicast group GDA (L3 GDA) is read from the administration message (1010). An L2 group address (L2 GRP) suitable for inclusion in the L2 address table is then formed by concatenating a chosen 16-bit key and the 32 bits of the L3 GDA (1015). The key must include an I/G bit equal to one (i.e., the least significant bit of the first octet in L2 GRP). It is then determined whether L2 GRP is already present in the table (1020). If the L2 GRP is already present in the table, then the administration operation designated in the administration message is performed on the table entry (1025). Such operations can include adding a subscriber, and therefore adding a destination port to the list of destination ports in the pre-existing entry if necessary, or removing a subscriber and therefore potentially removing that subscriber's port. If the L2 GRP is not already present in the table, then the newly formed L2 GRP will be added to a new entry in the L2 address table along with a listing of at least one port coupled to a subscriber node (1030).

Once administration on the L2 GRP entry has been performed, it is then determined whether the administration frame is an SSM administration message (1035). If the administration frame is not an SSM administration message, then the network device waits for a next multicast administration message.

Should the message be an SSM administration message, then an IP multicast source address (L3 SRC) is read from the message (1040). An L2 source address (L2 SRC) is then formed (1045) by using a table index (e.g., 710 from FIG. 7) determined in step 1020 or created in step 1030 as a second key that is coupled with the L3 SRC. A determination is then made as to whether there is a corresponding entry in the L2 address table to the L2 SRC (1050). If there is a corresponding entry, then the administration operation designated in the multicast administration message can be performed (1055). If there is no corresponding entry to L2 SRC address then a new entry can be made in the MAC destination table corresponding to L2 SRC, and the new entry includes a list of at least one port connected to subscriber nodes (1060). The network device can then wait for a next multicast administration message.

Figure 11:
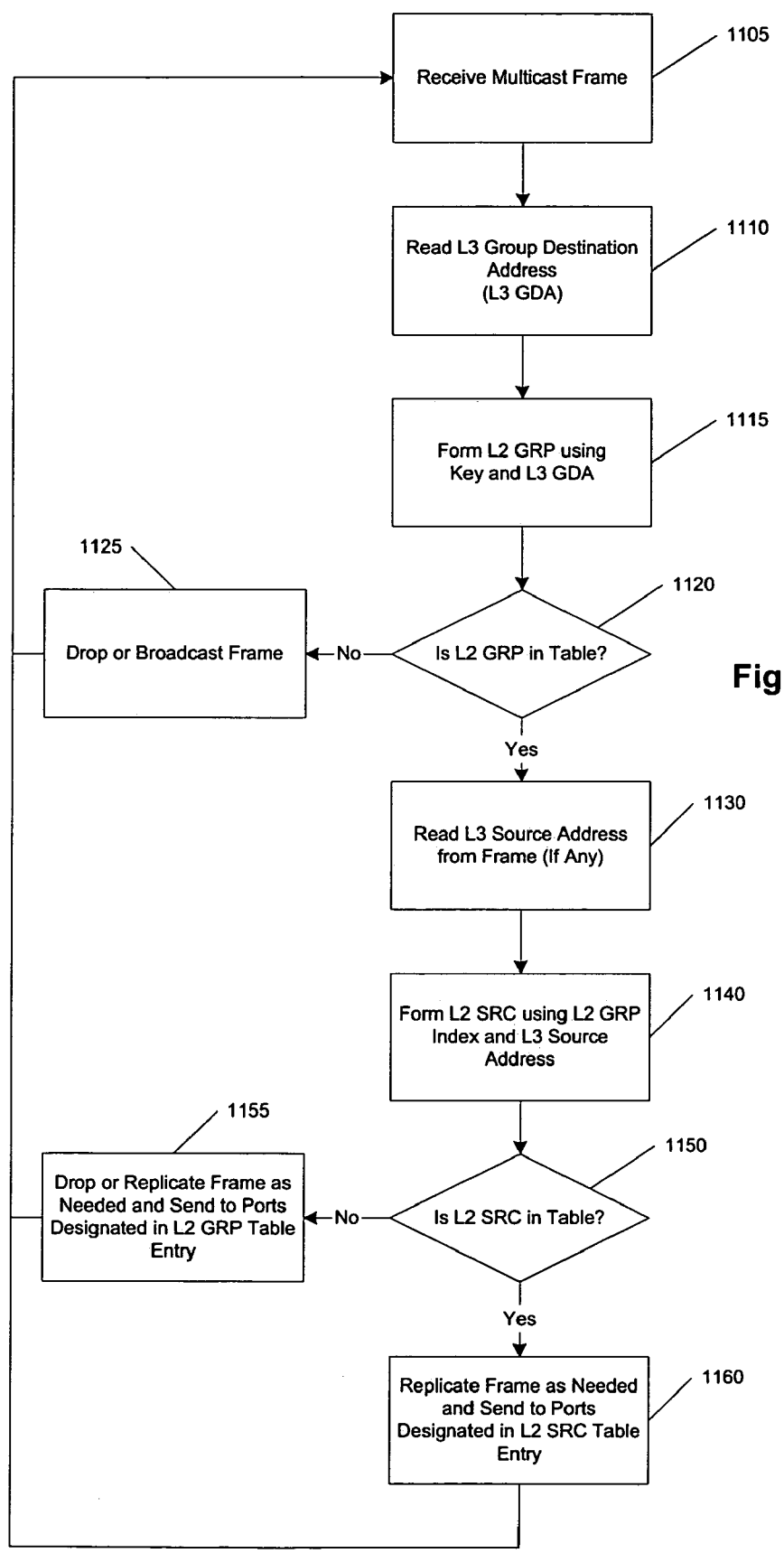
FIG. 11 is a simplified flow diagram illustrating a L2 address table lookup for multicast, including SSM, frames in accord with one embodiment of the present invention.

FIG. 11 is a simplified flow diagram illustrating an L2 address table lookup for multicast (SSM and non-SSM) frames in accord with one embodiment of the present invention. A network device (e.g., a switch) using an L2 address table incorporating modified L2 GDAs described above receives a multicast frame (1105). The device can then read the L3 group destination address (L3 GDA) from the multicast frame (1110). A Level 2 group address (L2 GRP) can be formed using the L3 GDA and a key that incorporates an I/G bit equal to one, wherein the key is the same as that used in the formation of the table entries as in FIG. 10 (1115). A determination is then made as to whether the formed L2 GRP is present in an entry in the L2 address table (1120). If there is no corresponding entry in the table then the frame can either be dropped or broadcast to all nodes, depending upon the specific implementation (1125). If the L2 GRP formed in 1115 has a corresponding entry in the table, then the network device reads a Level 3 source address (L3 SRC), if any is present, from the frame (1130). An L2 source address (L2 SRC) is formed by concatenating the L3 SRC and a key corresponding to the index (710) of the entry of the L2 GRP (1140). A determination is then made as to whether there is an entry in the L2 address table corresponding to L2 SRC (1150). If there is no corresponding entry (e.g., there was no L3 SRC in the multicast frame or there is no match for the L2 SRC), then the multicast frame can be replicated as needed and sent to all subscribers indicated in the L2 GRP entry or the frame can be dropped depending upon the implementation (1155). If there is a corresponding entry to the L2 SRC in the L2 address table, then the multicast frame can be replicated as needed and sent to the designated ports (1160).

Figure 12:
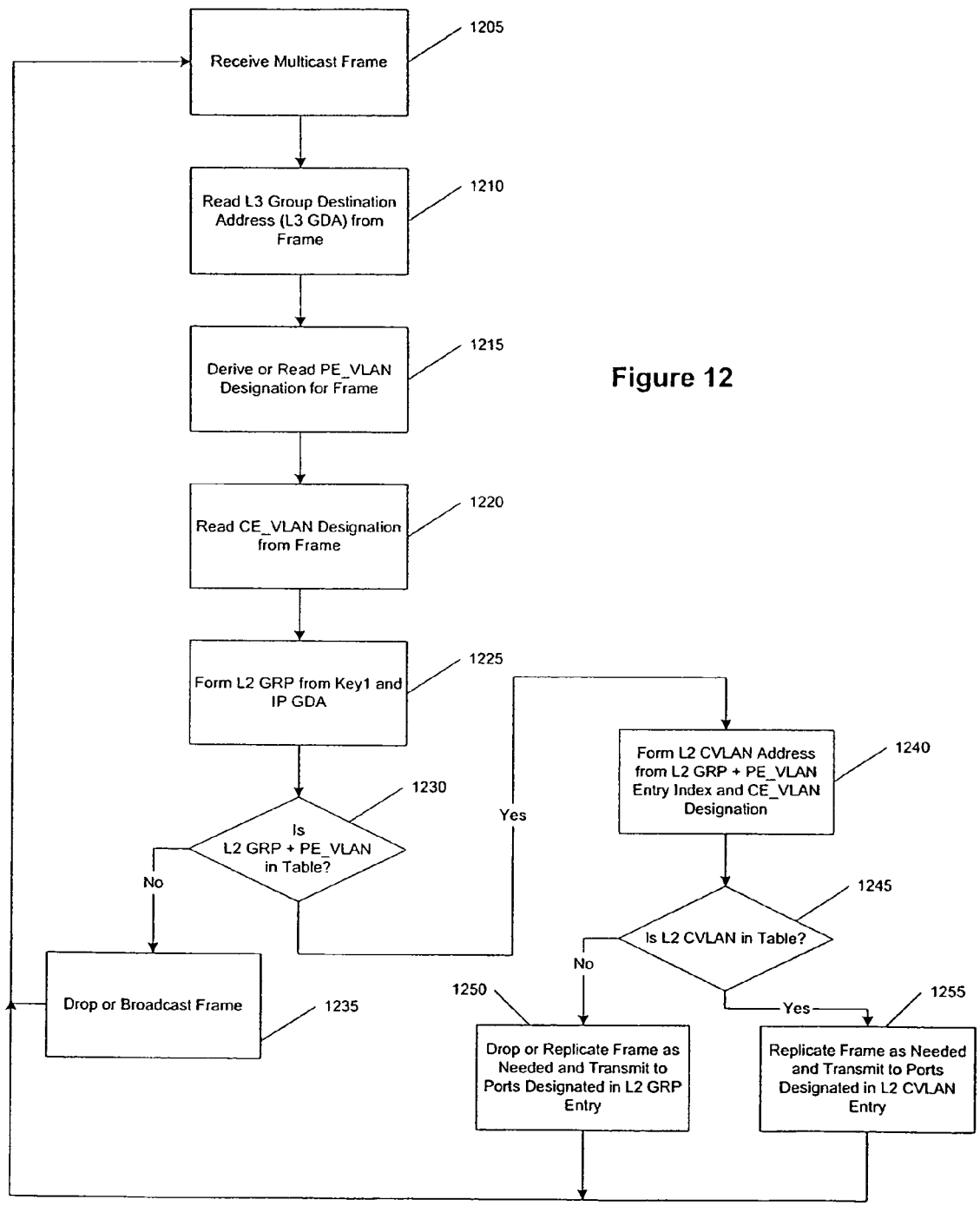
FIG. 12 is a simplified flow diagram illustrating a method for table lookup to resolve multicast addressing in a QinQ environment in accord with one embodiment of the present invention.

FIG. 12 is a simplified flow diagram illustrating a method for table lookup to resolve multicast addressing in a QinQ environment in accord with one embodiment of the present invention. A multicast frame formatted using QinQ is received by a network device incorporating a L2 address table embodying the concepts described above (1205). An L3 GDA is read from the received multicast frame (1210). A PE_VLAN designation and a CE_VLAN are also read or derived form the received multicast frame (1215, 1220). An L2 GRP is formed using a KEY1 and the L3 GDA, wherein KEY1 includes an I/G bit equal to one (1225). A determination is made as to whether L2 GRP and the PE_VLAN have a corresponding entry in the L2 address table (1230). If there is no such corresponding entry in L2 address table then the switch can drop or broadcast the multicast frame depending upon the implementation (1235). Should there be a corresponding entry to the L2 GRP and PE_VLAN in the L2 address table, then an L2 CVLAN address can be formed incorporating an index of the table entry found in 1230 and the CE_VLAN designated derived from the multicast frame (1240). A determination is made as to whether an entry matching the L2 CVLAN+PE_VLAN is present in the L2 address table (1245). If there is no such corresponding entry, then the frame can be replicated and transmitted to the ports subscribing to the L2 GRP or be dropped depending upon the implementation (1250). If there is a corresponding entry to the L2 CVLAN address in the L2 address table, then the multicast frame can be replicated as needed and sent to the designated ports (1255).

Figure 13:
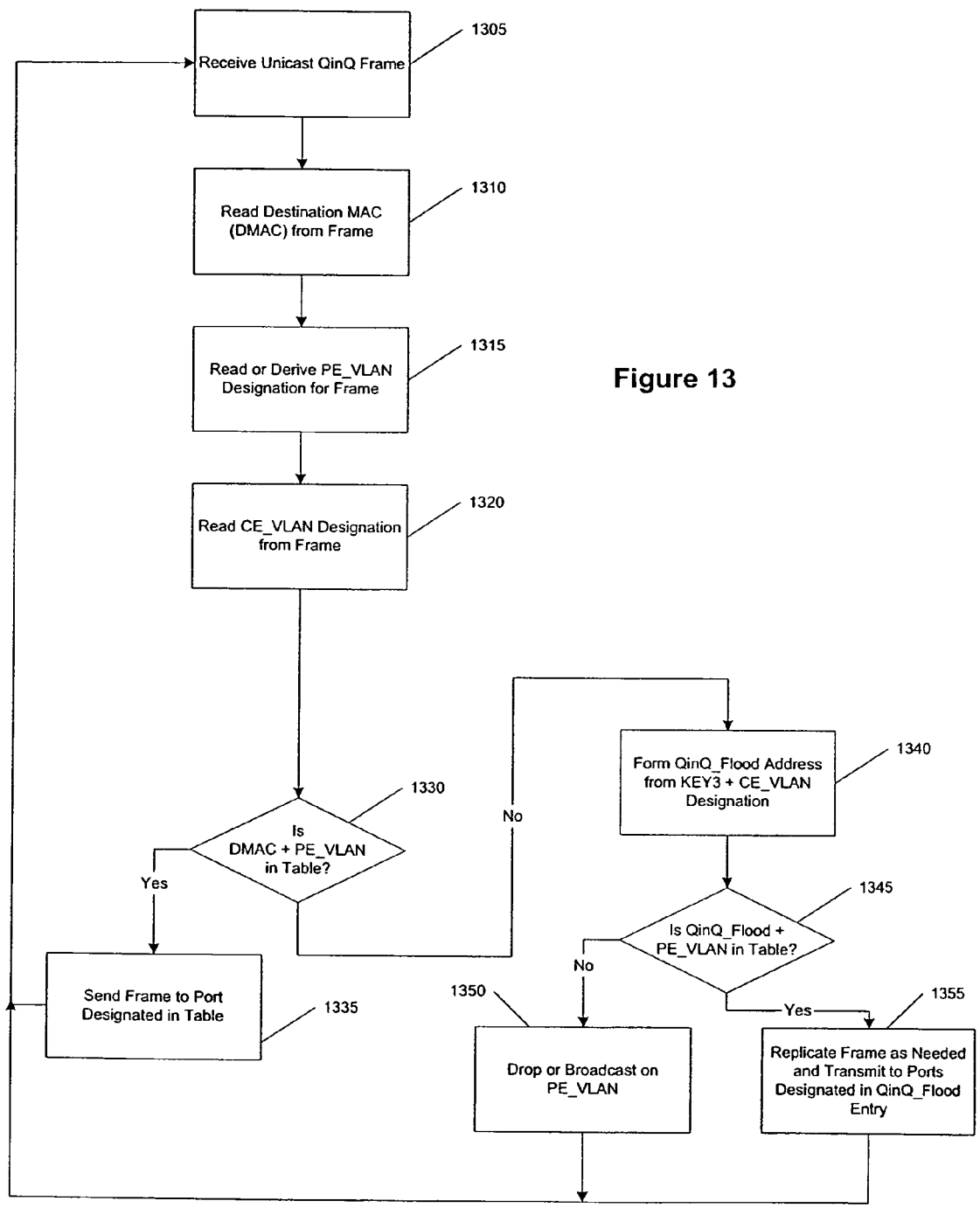
FIG. 13 is a simplified flow diagram illustrating a method for table lookup to resolve unicast addressing in a QinQ environment in accord with one embodiment of the present invention.

FIG. 13 is a simplified flow diagram illustrating a method for table lookup to resolve unicast addressing in a QinQ environment in accord with one embodiment of the present invention. A unicast frame formatted using QinQ is received by a network device incorporating a L2 address table embodying the concepts described above (1305). A destination MAC address (DMAC) is read from the received unicast frame (1310). A PE_VLAN designation and a CE_VLAN are also read or derived from the received unicast frame (1315, 1320). A determination is made as to whether DMAC and the PE_VLAN have a corresponding entry in the L2 address table (1330). If there is a corresponding entry in L2 address table then the switch can transmit the frame to the port designated in the table (1335). Should there not be a corresponding entry to the DMAC and PE_VLAN in the L2 address table, then a QinQ_Flood address can be formed incorporating a key and the CE_VLAN designation derived from the unicast frame (1340). A determination is made as to whether the QinQ_Flood address and the PE_VLAN are present as a entry in the L2 address table (1345). If there is no such corresponding entry, then the frame can be broadcast on PE_VLAN or be dropped depending upon the implementation (1350). If there is a corresponding entry to the QinQ_Flood+PE_VLAN in the L2 address table, then the frame can be replicated as needed and sent to the ports designated in that entry (1355).

The examples discussed thus far all involve using L2 address tables that incorporate entries that are modified to include 32 bits of an L3 address for lookup. Such a 32-bit address field can comprise an entire IPv4 multicast group destination address. But there will still be lost address bits if incorporating IPv6 multicast GDAs because such addresses include 128 bits of data. Given the limitations of a 48-bit MAC address, address aliasing problems for IPv6 cannot be fully resolved with the present invention, however, the increased space for address lengths that result from the present invention can reduce the address aliasing problem. Further, more than 32-bits can be provided by the present invention through the use of keys that are fewer than 16 bits in length or through the use of another key in conjunction with additional address space in a broadcast domain field in L2 address table entries.

An Example Computing and Network Environment

As shown above, the present invention can be implemented using a variety of computer systems and networks. An example of one such computing and network environment is described below with reference to FIGS. 14 and 15.

Figure 14:
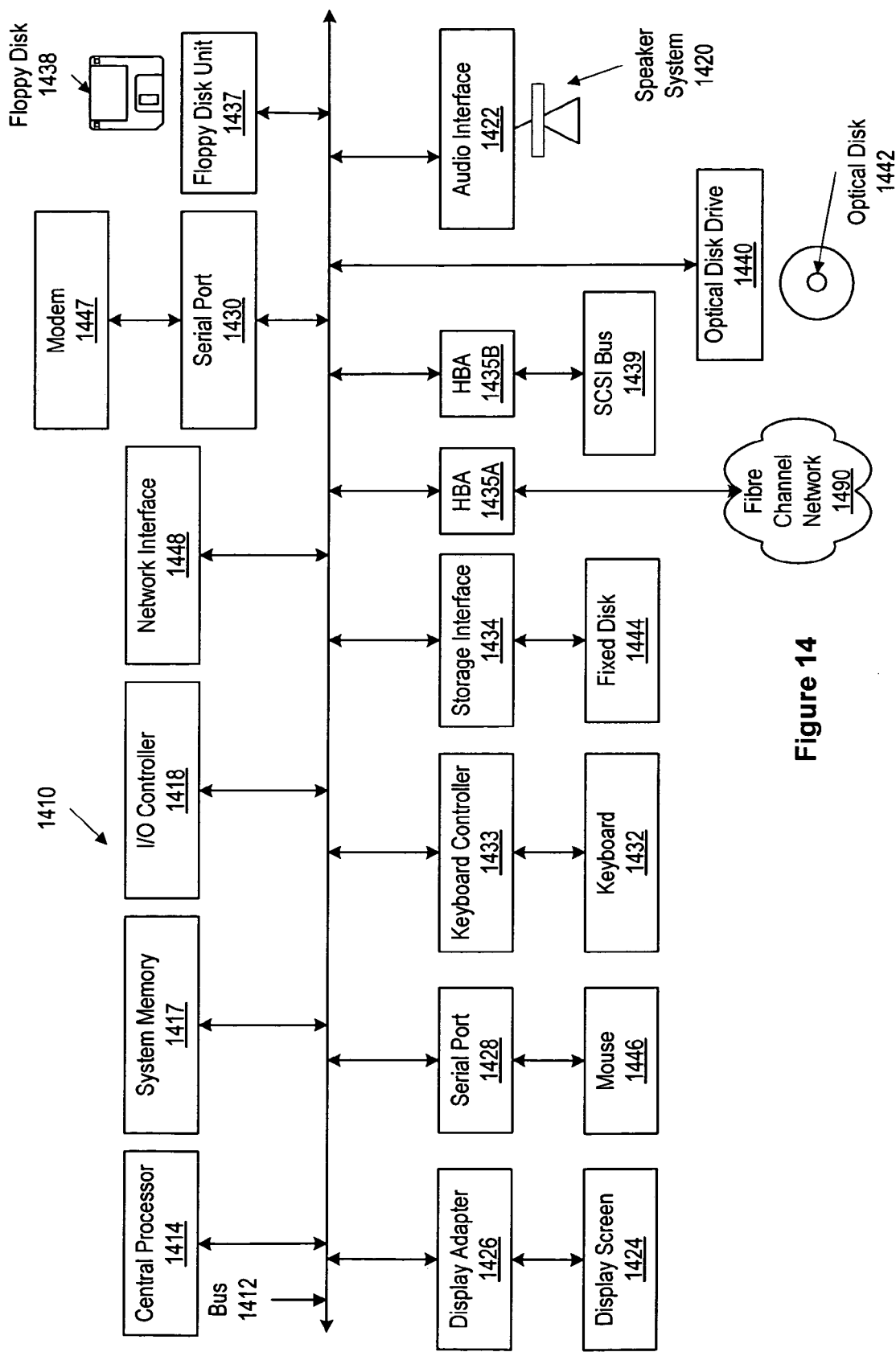
FIG. 14 depicts a block diagram of a computer system suitable for implementing the present invention.

FIG. 14 depicts a block diagram of a computer system 1410 suitable for implementing the present invention. Computer system 1410 includes a bus 1412 which interconnects major subsystems of computer system 1410, such as a central processor 1414, a system memory 1417 (typically RAM, but which may also include ROM, flash RAM, or the like), an input/output controller 1418, an external audio device, such as a speaker system 1420 via an audio output interface 1422, an external device, such as a display screen 1424 via display adapter 1426, serial ports 1428 and 1430, a keyboard 1432 (interfaced with a keyboard controller 1433), a storage interface 1434, a floppy disk drive 1437 operative to receive a floppy disk 1438, a host bus adapter (HBA) interface card 1435A operative to connect with a fibre channel network 1490, a host bus adapter (HBA) interface card 1435B operative to connect to a SCSI bus 1439, and an optical disk drive 1440 operative to receive an optical disk 1442. Also included are a mouse 1446 (or other point-and-click device, coupled to bus 1412 via serial port 1428), a modem 1447 (coupled to bus 1412 via serial port 1430), and a network interface 1448 (coupled directly to bus 1412).

Bus 1412 allows data communication between central processor 1414 and system memory 1417, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with computer system 1410 are generally stored on and accessed via a computer readable medium, such as a hard disk drive (e.g., fixed disk 1444), an optical drive (e.g., optical drive 1440), a floppy disk unit 1437, or other storage medium. Additionally, applications can be in the form of electronic signals modulated in accordance with the application and data communication technology when accessed via network modem 1447 or interface 1448.

Storage interface 1434, as with the other storage interfaces of computer system 1410, can connect to a standard computer readable medium for storage and/or retrieval of information, such as a fixed disk drive 1444. Fixed disk drive 1444 may be a part of computer system 1410 or may be separate and accessed through other interface systems. Modem 1447 may provide a direct connection to a remote server via a telephone link or to the Internet via an internet service provider (ISP). Network interface 1448 may provide a direct connection to a remote server via a direct network link to the Internet via a POP (point of presence). Network interface 1448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 14 need not be present to practice the present invention. The devices and subsystems can be interconnected in different ways from that shown in FIG. 14. The operation of a computer system such as that shown in FIG. 14 is readily known in the art and is not discussed in detail in this application. Code to implement the present invention can be stored in computer-readable storage media such as one or more of system memory 1417, fixed disk 1444, optical disk 1442, or floppy disk 1438. Additionally, computer system 1410 can be any kind of computing device, and so includes personal data assistants (PDAs), network appliance, X-window terminal or other such computing devices. The operating system provided on computer system 1410 may be MS-DOS®, MS-WINDOWS®, OS/2®, UNIX®, Linux®, or another known operating system. Computer system 1410 also supports a number of Internet access tools, including, for example, an HTTP-compliant web browser having a JavaScript interpreter, such as Netscape Navigator®, Microsoft Internet Explorer®, and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 15:
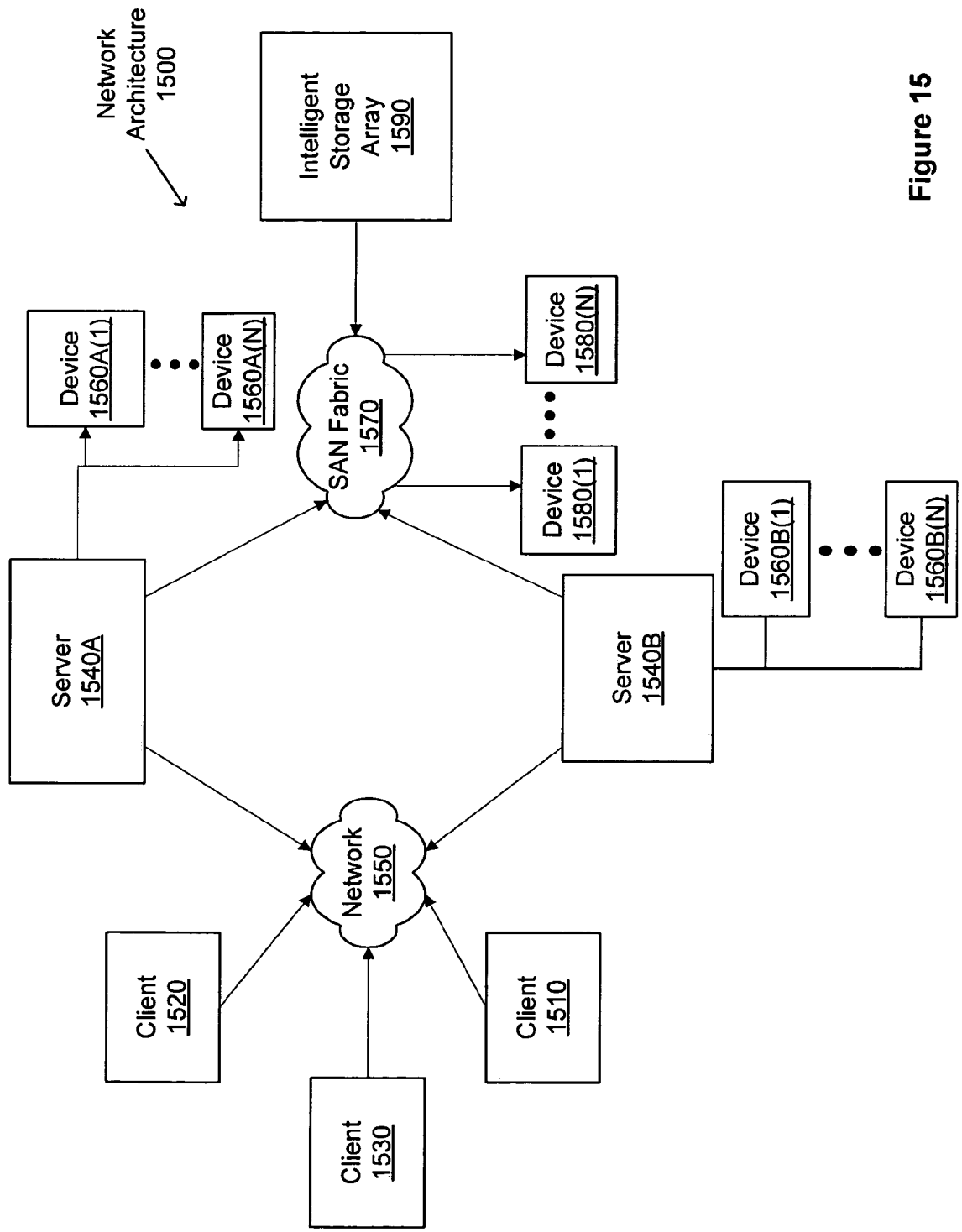
FIG. 15 is a block diagram depicting a network architecture suitable for implementing the present invention.

FIG. 15 is a block diagram depicting a network architecture 1500 in which client systems 1510, 1520 and 1530, as well as storage servers 1540A and 1540B (any of which can be implemented using computer system 1410), are coupled to a network 1550. Storage server 1540A is further depicted as having storage devices 1560A(1)-(N) directly attached, and storage server 1540B is depicted with storage devices 1560B(1)-(N) directly attached. Storage servers 1540A and 1540B are also connected to a SAN fabric 1570, although connection to a storage area network is not required for operation of the invention. SAN fabric 1570 supports access to storage devices 1580(1)-(N) by storage servers 1540A and 1540B, and so by client systems 1510, 1520 and 1530 via network 1550. SAN fabric 1570 can include one or more switches configured to perform storage virtualization. Intelligent storage array 1540 is also shown as an example of a specific storage device accessible via SAN fabric 1570.

With reference to computer system 1510, modem 1547, network interface 1548 or some other method can be used to provide connectivity from each of client computer systems 1510, 1520 and 1530 to network 1550. Client systems 1510, 1520 and 1530 are able to access information on storage server 1540A or 1540B using, for example, a web browser or other client software (not shown). Such a client allows client systems 1510, 1520 and 1530 to access data hosted by storage server 1540A or 1540B or one of storage devices 1560A(1)-(N), 1560B(1)-(N), 1580(1)-(N) or intelligent storage array 1590. FIG. 15 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1410). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method implemented by a network device using an OSI Level 2 address table, said method comprising:
    forming, by the network device, an L2 group address (L2 GRP) comprising an OSI Level 3 multicast group destination address (L3 GDA) and a first key;
    storing the L2 GRP in a first table entry of the OSI Level 2 address table;
    setting a bit in the first key identifying that the first table entry comprises a multicast address;
    reading, by the network device, a first OSI Level 3 group destination address from a multicast frame;
    forming, by the network device, a first search term comprising
        the first key, and
        the first OSI Level 3 group destination address; and
    comparing, by the network device, the first search term with the L2 GRP.

2. The method of claim 1, wherein
the first key identifies the first table entry as containing the first L3 GDA.

3. The method of claim 1 further comprising:
transmitting the multicast frame via one or more ports of the network device designated in the first table entry, if said comparing the first search term with the L2 GRP results in a match.

4. The method of claim 1 further comprising:
    forming, by the network device, an L2 source address (L2 SRC) comprising a first OSI Level 3 multicast source address (L3 SRC) and a second key; and
    storing the L2 SRC in a second table entry of the OSI Level 2 address table.

5. The method of claim 4 further comprising:
if the first search term matches L2 GRP,
    forming, by the network device, a second search term comprising
        an index of the first table entry, and
        an OSI Level 3 source address from the multicast frame; and
    comparing, by the network device, the second search term with L2 SRC.

6. The method of claim 5 further comprising:
transmitting the multicast frame via one or more ports of the network device designated in the second table entry, if said comparing the second search term with the L2 SRC results in a match.

7. A method implemented by a network device using an OSI Level 2 address table, said method comprising:
    forming, by the network device, an L2 group address (L2 GRP) comprising an OSI Level 3 multicast group destination address (L3 GDA) and a first key;
    storing the L2 GRP in a first table entry of the OSI Level 2 address table;
    the first key identifies the first table entry as containing the first L3 GDA;
    storing a first provider virtual LAN (PE_VLAN) identifier in the first table entry; and
    storing a first customer virtual LAN (CE_VLAN) identifier in a third table entry of the OSI Level 2 address table.

8. The method of claim 7 further comprising:
    reading, by the network device, a second OSI Level 3 group destination address from a QinQ formatted multicast frame;
    forming, by the network device, a third search term comprising
        the first key, and
        the second OSI Level 3 group destination address; and
    comparing, by the network device, the third search term and a first VLAN designator from the QinQ formatted multicast frame with L2 GRP and the PE_VLAN identifier in the first table entry; and
    if the third search term and the first VLAN designator match L2 GRP and the PE_VLAN identifier,
        forming, by the network device, a fourth search term comprising
            an index of the first table entry, and
            a second VLAN identifier from the QinQ formatted multicast frame, and
        comparing, by the network device, the fourth search term with a second key and the CE_VLAN identifier stored in the third table entry, and
        transmitting data from the QinQ formatted multicast packet to one or more network switch ports of the network device designated in the third table entry, if the fourth search term matches the second key and the CE_VLAN.

9. A computer-readable storage medium storing program instructions executable by a network device using an OSI Level 2 address table to perform steps comprising:
    forming an L2 group address (L2 GRP) comprising an OSI Level 3 multicast group destination address (L3 GDA) and a first key; and
    storing the L2 GRP in a first table entry of an OSI Level 2 address table;
    reading a first OSI Level 3 group destination address from a multicast frame;
    forming a first search term comprising
        the first key, and
        the first OSI Level 3 group destination address;
    comparing the first search term with the L2 GRP; and
    transmitting the multicast frame via one or more ports designated in the first table entry, if said comparing the first search tem with the L2 GRP results in a match.

10. The computer-readable storage medium of claim 9 storing program instructions executable by the network device to perform steps further comprising:
    forming an L2 source address (L2 SRC) comprising a first OSI Level 3 multicast source address (L3 SRC) and a second key;
    storing the L2 SRC in a second table entry of the OSI Level 2 address table;
    in response to said comparing the first search term with the L2 GRP resulting in a match:
        forming a second search term comprising
            an index of the first table entry, and
            an OSI Level 3 source address from the multicast packet;
        comparing the second search term with L2 SRC; and
        transmitting the multicast frame via one or more ports designated in the second table entry, if the second search term and L2 SRC match.

11. A computer-readable storage medium storing program instructions executable by a network device using an OSI Level 2 address table to perform steps comprising:

forming an L2 group address (L2 GRP) comprising an OSI Level 3 multicast group destination address (L3 GDA) and a first key;
storing the L2 GRP in a first table entry of an OSI Level 2 address table;
storing a first provider virtual LAN (PE_VLAN) identifier in the first table entry;
storing a first customer virtual LAN (CE_VLAN) identifier in a third table entry of the OSI Level 2 address table;
reading a second OSI Level 3 group destination address from a QinQ formatted multicast frame;
forming a third search term comprising
the first key, and
the second OSI Level 3 group destination address;
comparing the third search term and a first VLAN designator from the QinQ formatted multicast frame with L2 GRP and the PE_VLAN identifier in the first table entry; and
in response to said comparing resulting in a match:
forming a fourth search term comprising
an index of the first table entry, and
a second VLAN identifier from the QinQ formatted multicast frame,
comparing the fourth search term with a second key and the CE_VLAN identifier stored in the third table entry, and
transmitting data from the QinQ formatted multicast frame to one or more network switch ports designated in the third table entry, if the fourth search term matches the second key and CE_VLAN identifier stored in the third table entry.

12. A system comprising:
a first processor configured to generate an OSI Level 2 address table comprising a first table entry, wherein
the first table entry includes an L2 group address (L2 GRP) comprising an OSI Level 3 multicast group destination address (L3 GDA) and a first key, wherein a bit in the first key identifies that the first table entry comprises a multicast address;
a memory, coupled to the first processor, and configured to store the OSI Level 2 address table;
a first port configured to receive a multicast frame; and
a second processor, coupled to the first port and the OSI Level 2 address table, and configured to
read a first OSI Level 3 group destination address from the multicast frame,
form a first search term comprising
the first key, and
the first OSI Level 3 group destination address, and
compare the first search term with the L2 GRP; and
a switch fabric, coupled to the second processor and the first port, and, in response to the first search term matching the L2 GRP, configured to replicate the multicast frame, and
transmit replicated multicast frames to one or more ports coupled to the switch fabric, wherein
the one or more ports coupled to the switch fabric are designated in the first table entry.

13. The system of claim 12 wherein the OSI Level 2 address table further comprises:
a second table entry including an L2 source address (L2 SRC) comprising a first OSI Level 3 multicast source address (L3 SRC) and a second key.

14. The system of claim 13 further comprising:
the second processor, in response to the first search term matching L2 GRP, further configured to
form a second search term comprising
an index of the first table entry, and
an OSI Level 3 source address from the multicast frame, and
compare the second search term with L2 SRC; and
the switch fabric, in response to the second search term matching L2 SRC, further configured to
replicate the multicast frame, and
transmit replicated multicast frames to one or more ports coupled to the switch fabric, wherein
the one or more ports coupled to the switch fabric are designated in the second table entry.

15. A system comprising:
a first processor configured to generate an OSI Level 2 address table comprising a first table entry, wherein
the first table entry includes an L2 group address (L2 GRP) comprising an OSI Level 3 multicast group destination address (L3 GDA) and a first key, wherein a bit in the first key identifies that the first table entry comprises a multicast address;
a memory, coupled to the first processor, and configured to store the OSI Level 2 address table;
the first table entry further includes a first provider virtual LAN (PE_VLAN) identifier; and
a third table entry including a first customer virtual LAN (CE_VLAN) identifier.

16. The system of claim 15 further comprising:
a second port configured to receive a QinQ formatted frame;
a third processor, coupled to the first port and the OSI Level 2 address table, and configured to
read a second OSI Level 3 group destination address from the QinQ formatted frame,
form a third search term comprising
the first key, and
the second OSI Level 3 group destination address, and
compare the third search term and a first VLAN designator from the QinQ formatted frame with L2 GRP and the PE_VLAN identifier in the first table entry, and
if the third search term and the first VLAN designator match L2 GRP and the PE_VLAN identifier,
form a fourth search term comprising
an index of the first table entry, and
a second VLAN identifier from the QinQ formatted frame, and
compare the fourth search term with a second key and the CE_VLAN identifier stored in the third table entry; and
a switch fabric, coupled to the third processor and the second port, and, in response to the fourth search term matching the second key and the CE_VLAN, configured to
transmit the QinQ formatted frame to one or more ports coupled to the switch fabric, wherein
the one or more ports coupled to the switch fabric are designated in the third table entry.

* * * * *